US010657286B2

(12) United States Patent
Nambiar et al.

(10) Patent No.: US 10,657,286 B2
(45) Date of Patent: May 19, 2020

(54) SYSTEM, APPARATUS AND METHOD FOR ANONYMIZING DATA PRIOR TO THREAT DETECTION ANALYSIS

(71) Applicant: Hewlett Packard Enterprise Development LP, Houston, TX (US)

(72) Inventors: Brijesh Nambiar, Santa Clara, CA (US); Mohan Parthasarathy, Cupertino, CA (US); Prasad Palkar, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 247 days.

(21) Appl. No.: 14/994,954

(22) Filed: Jan. 13, 2016

(65) Prior Publication Data
US 2016/0203336 A1 Jul. 14, 2016

Related U.S. Application Data

(60) Provisional application No. 62/103,448, filed on Jan. 14, 2015, provisional application No. 62/197,485, filed on Jul. 27, 2015.

(51) Int. Cl.
G06F 9/00 (2006.01)
G06F 21/62 (2013.01)
G06F 21/60 (2013.01)

(52) U.S. Cl.
CPC ........ *G06F 21/6254* (2013.01); *G06F 21/602* (2013.01); *G06F 21/6245* (2013.01)

(58) Field of Classification Search
CPC .................................................. G06F 21/6254
USPC .......................................................... 726/26
See application file for complete search history.

(56) References Cited

U.S. PATENT DOCUMENTS

2005/0209975 A1* 9/2005 So ................ G06F 21/606
  705/71
2009/0265788 A1  10/2009 Ehrenschwender et al.
2014/0115710 A1* 4/2014 Hughes ............... G06F 21/6245
  726/26
2016/0085915 A1* 3/2016 Seow .................. G06F 19/322
  705/3

FOREIGN PATENT DOCUMENTS

EP  1 026 603 A2  8/2000
EP  1 099 996 A1  5/2001
WO  95/15628 A1   6/1995

OTHER PUBLICATIONS

PCT/US2016/013275 filed Jan. 13, 2016 International Search Report and Written Opinion dated Mar. 21, 2016.

* cited by examiner

*Primary Examiner* — Christopher J Brown
(74) *Attorney, Agent, or Firm* — Sheppard, Mullin Richter & Hampton

(57) ABSTRACT

A computerized method involves obfuscating one or more segments of data that is part of a flow prior to analysis of the flow for malware. Each of the one or more obfuscated data corresponds to one or more anonymized data. Thereafter, an identifier is generated for each of the one or more anonymized data, and each identifier is substituted for its corresponding anonymized data. The anonymized data and its corresponding identifiers are separately maintained from the stored flow.

11 Claims, 10 Drawing Sheets

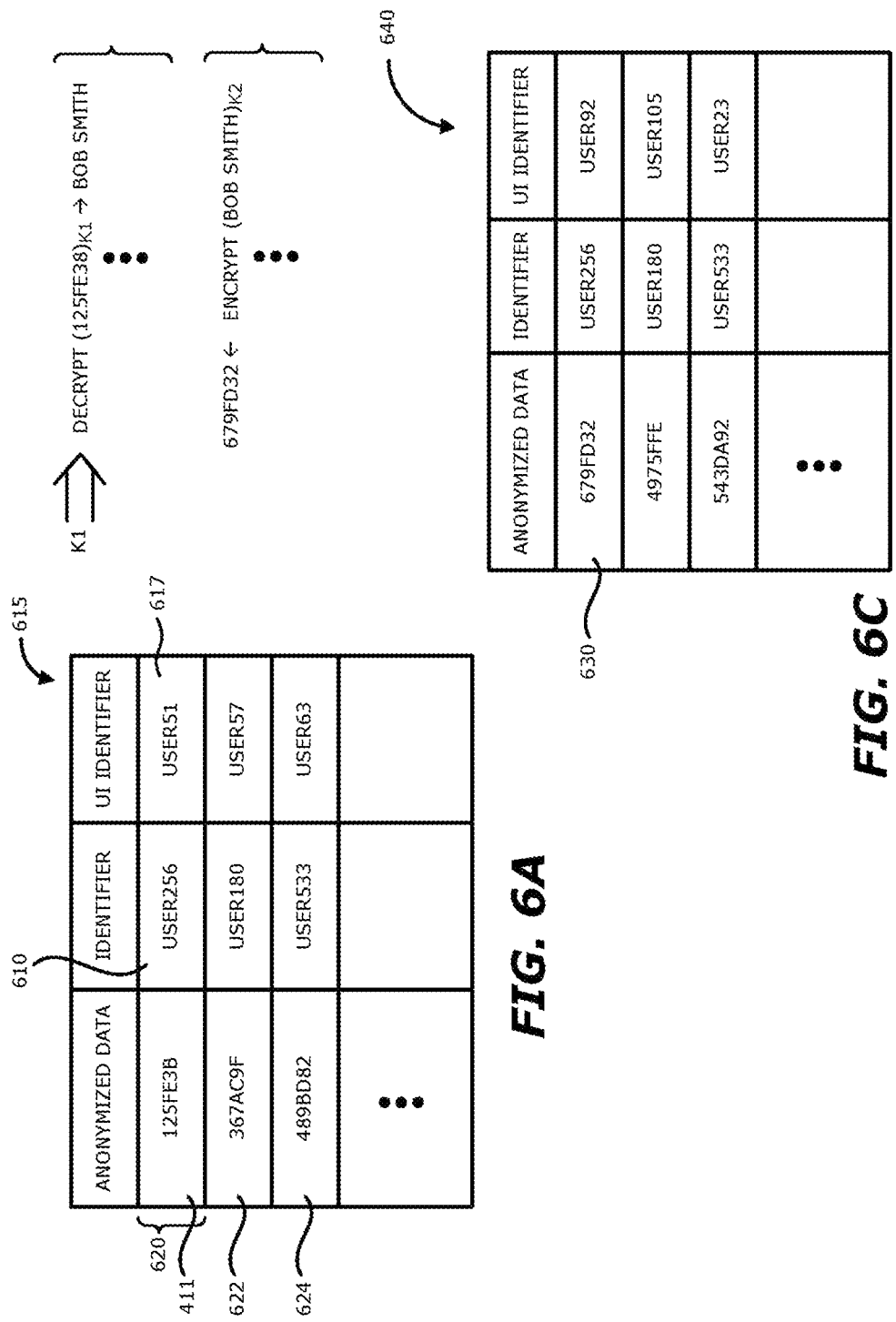

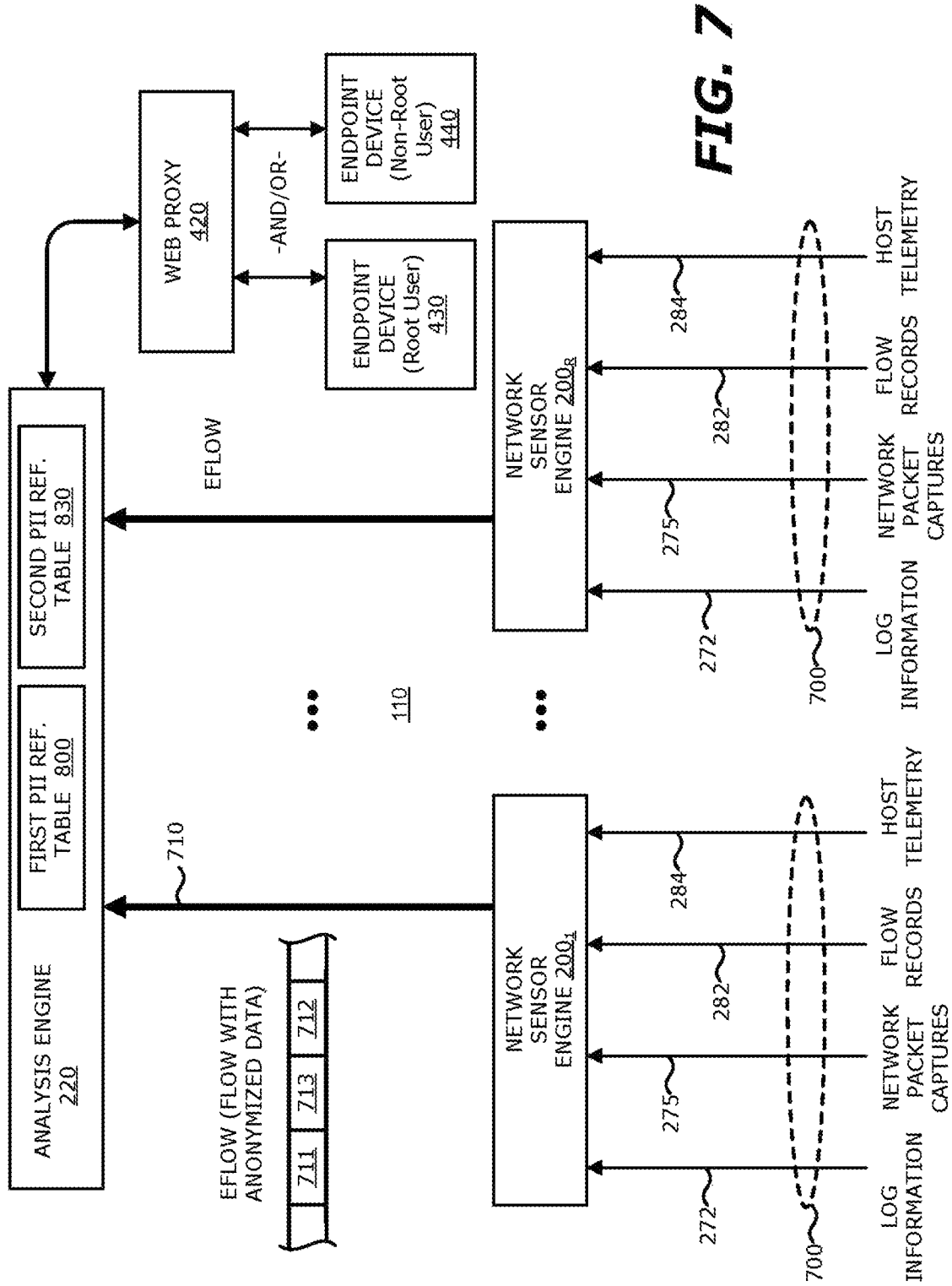

SYSTEM, APPARATUS AND METHOD FOR ANONYMIZING DATA PRIOR TO THREAT DETECTION ANALYSIS

CROSS-REFERENCE TO RELATED APPLICATIONS

This application claims the benefit of priority on U.S. Provisional Application No. 62/103,448, filed on Jan. 14, 2015 and U.S. Provisional Application No. 62/197,485 filed on Jul. 27, 2015, the entire contents of both of these applications in incorporated by reference.

1. FIELD

Embodiments of the disclosure relate to the field of cyber security.

2. GENERAL BACKGROUND

Over the last few years, the general populous has encountered the proliferation of malicious software (sometimes referred to as "malware") over the Internet. Malware has many forms including exploits, namely information that attempts to take advantage of a vulnerability in software that is loaded onto an electronic device in order to adversely influence or attack operations of that electronic device. Despite repeated efforts through advanced detection systems and software patches to address software vulnerabilities, malware continues to evade and infect electronic devices worldwide.

In combatting the spread of malware, it has become paramount that a vast amount of information associated with network traffic, which is propagating to/from/within an enterprise network over a prolonged period of time, is analyzed for malware. This stored information offers immeasurable value for incident response testing so that security personnel can better understand when and how a network breach (e.g., malware infection of one or more endpoint devices within an enterprise network) occurred within an enterprise (e.g., a company, governmental agency, or other entity) in order to address current security issues associated with the enterprise network.

Normally, incident response testing is handled by persons outside of the enterprise such as a contracted, cyber security service provider. In some cases, incident response testing may pose a security risk as well, especially when the stored information supplied for testing includes personally identifiable information (PII). "PII" is information that can be used to identify a specific user to which the information pertains. Examples of different types of PII include, but are not limited or restricted to user names, phone numbers, home addresses, machine names, and/or social media account names.

For instance, without being anonymized, the PII is now accessible to persons outside of the enterprise which, by itself, creates a security risk that such information may be used inappropriately. Another security risk is that there is no defined access hierarchy for PII that is part of the stored information. Rather, anyone with access to the stored information also has access to the PII. Lastly, as the stored information including the PII is subsequently stored for incident response testing, there is a risk that systems associated with the incident response testing may become compromised, thereby gaining unauthorized access to the PII.

Anonymization may be accomplished by obfuscating the sensitive information, such as PII for example. Such obfuscation may involve conducting cryptographic operations (e.g., encryption/decryption, one-way hashes, etc.) on the sensitive information. However, in response to various events, such as cryptographic keying material becoming compromised or customer preferences, such keying material would need to be changed. Currently, this change would require cryptographically secured information, perhaps millions or even billions of entries within stored network traffic, to be re-encrypted. Depending on the frequency in changing of the keying material, this could be a challenging task for cyber security service providers.

BRIEF DESCRIPTION OF THE DRAWINGS

Embodiments of the invention are illustrated by way of example and not by way of limitation in the figures of the accompanying drawings, in which like references indicate similar elements and in which:

FIG. 6A is an exemplary embodiment of a first logical storage element represented as a Personally Identifiable Information (PII) reference table.

FIG. 6C is an exemplary embodiment of the first logical storage element represented as the PII reference table after undergoing a global obfuscation change.

FIG. 7 is a second exemplary embodiment of the operational flow for maintaining anonymized data and effectively handling re-obfuscation of the anonymized data within the security framework of FIGS. 1-2.

DETAILED DESCRIPTION

Figure 1:
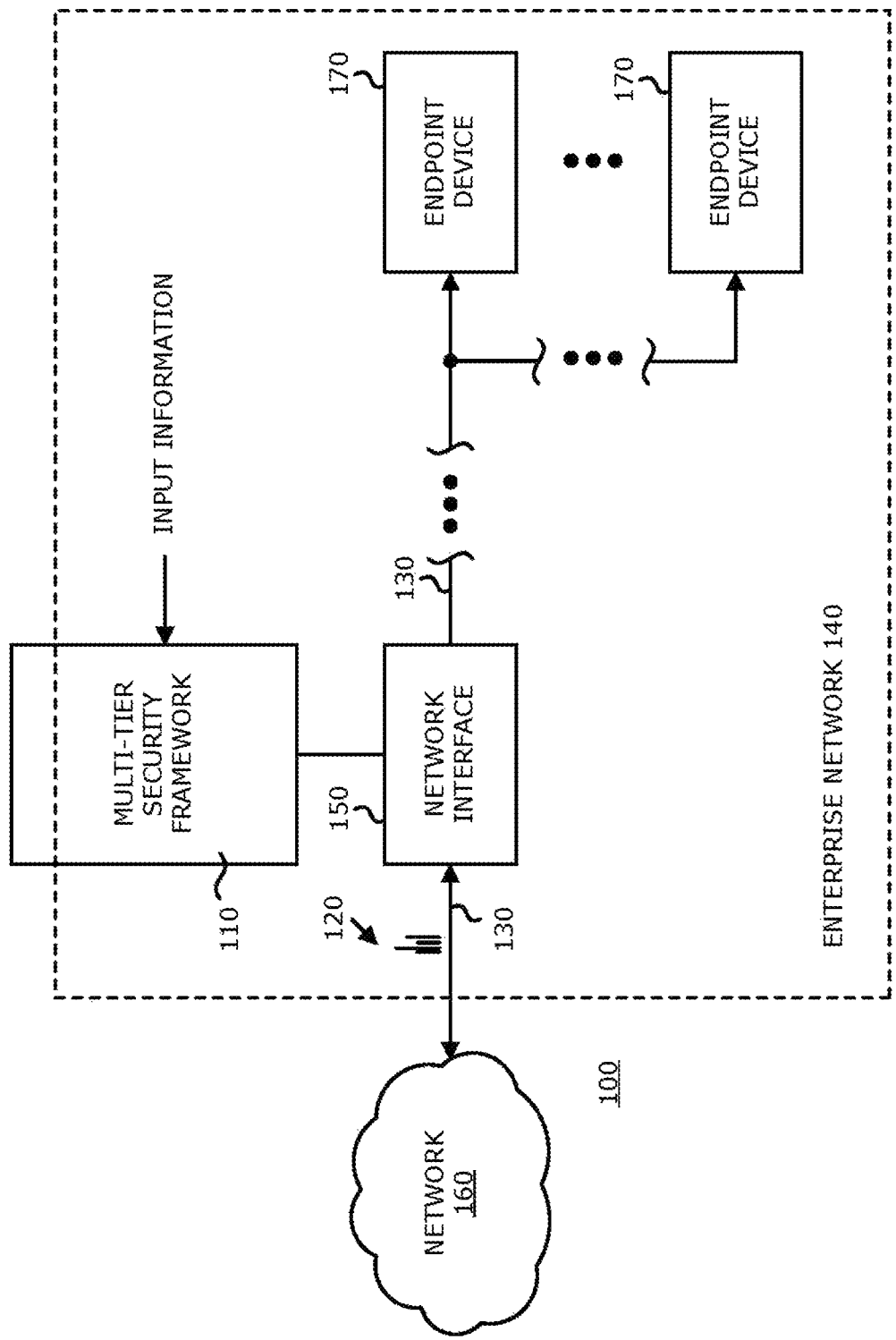
FIG. 1 is an exemplary block diagram of a communication system deploying a multi-tier security framework.

Various embodiments of the disclosure relate to a system, apparatus and method for (i) receiving a flow of information that includes anonymized data (hereinafter referred to as an "eflow") and, where appropriate, (ii) generating an identifier that represents the anonymized data. The identifier is generated for anonymized data from which subsequent recovery of the anonymized data as cleartext is desired.

Instead of being stored as the collection of anonymized data and non-anonymized data received by the analysis engine from one or more network sensor engines, an eflow is stored with one or more identifiers in lieu of corresponding anonymized data. Stated differently, anonymized data within an eflow is extracted and substituted with its corresponding identifier. The correspondence between the anonymized data and its identifier is maintained separately from the stored flows. As a result, in response to a change in the obfuscation scheme, such as a change in cryptographic keys that are used in the generation of the anonymized data from cleartext for example, the anonymized data would need to be subsequently modified. However, the stored flows would not need to be modified as the identifier(s) would remain unchanged.

More specifically, a flow may include a single segment of anonymized data that is associated with a particular classification or multiple segments of anonymized data which may be associated with different classifications. Examples of classifications for anonymized data may include, but is not limited or restricted to the following classes: (1) user data (e.g., user name, device name, group name, etc.), (2) contact data (e.g., home address, phone number, former residence information, etc.), and/or (3) passcode data (e.g., password, personal identification number "PIN", etc.).

An identifier is uniquely assigned to a segment of anonymized data when recovery of the non-anonymized data may be needed later in time. In some cases, identifiers may not be assigned to certain anonymized data classifications because recovery of that the non-anonymized data (cleartext) is not desired. For instance, a password that is anonymized may not be assigned an identifier when recovery of the password in cleartext is not desired for system configuration. Rather, this particular anonymized data is maintained as part of the eflow.

According to one embodiment of the disclosure, upon receipt of an eflow, an analysis engine analyzes each segment of anonymized data to determine if cleartext recovery from that anonymized data is desired. If so, for each segment, the anonymized data is extracted from the eflow and an identifier is generated for that anonymized data. Thereafter, each unique segment of extracted anonymized data along with its corresponding identifier is stored in one or more entries of a first logical storage element (e.g., a first table, a first storage region, etc.). The remaining non-anonymized data within that particular eflow (and anonymized data for which cleartext recovery is not desired) and the identifier(s) are stored in one or more entries of a second logical storage element (e.g., a second table, a second storage region, etc.). After a prolonged period of time, the number of populated entries of the second logical storage element, which include at least the non-anonymized data for a particular node (e.g., user, device, etc.), will greatly exceed the number of populated entries within the first logical storage element for that particular node, normally at least a factor of $10^5$.

Hence, a change in the obfuscation scheme involves an alteration of the anonymized data within the first logical storage element. However, no alteration of data within the second logical storage element is required, which reduces the amount of system complexity needed in handling changes in the obfuscation scheme such as changing cryptographic keys.

Of course, according to another embodiment of the disclosure, the anonymized data within a particular eflow along with a corresponding identifier may be stored in a first region of memory while the non-anonymized data within that particular eflow and the identifier are stored in a second region of memory. Again, after a prolonged period of time, the number of entries, which correspond to the number of stored eflows, will greatly exceed the number of entries needed for the unique anonymized data uploads.

Herein, the "anonymized data" includes customer sensitive information, such as personally identifiable information (PII) for example, that is obfuscated. PII may be obfuscated by conducting cryptographic operations on the sensitive information using keying material. Where it is desirable for the data to be available for recovery in cleartext, the cryptographic operations may involve encrypting some or all of the sensitive information using keying material that allows for cleartext recovery (e.g., one or more cryptographic keys).

Additionally, where cleartext recovery is unnecessary (e.g. passwords), the cryptographic operations may include (1) conducting a one-way hash operation on the sensitive information (where the sensitive information cannot be recovered and no identifier is assigned for the hashed information) or (2) assigning an arbitrary generic value (e.g., a predetermined number of alphanumeric characters or symbols "***") or even a random or pseudo-random value to obfuscate the sensitive information.

The "identifier" includes a representation (e.g., a string of alphanumeric characters and/or symbols) for a node to which the flow of information pertains, but obfuscates the actual identity of the node. For instance, as an illustrative embodiment, where the sensitive information constitutes a user name (Bob Smith), the anonymized data may result in an anonymized value (125FE35) while the identifier may be auto-generated as a particular user number (User256). Any subsequent change in the keying material may cause the anonymized data to change (125FE35→679F032), but the identifier (User256), which is used as a reference (e.g., a source, destination, etc.) for one or more eflows that may undergo subsequent malware analysis, perhaps by logic within the analysis engine 220, remains unchanged.

According to an illustrative embodiment of the disclosure, a network sensor engine receives input information from at least one source and anonymizes sensitive information, such as personally identifiable information (hereinafter "PII") associated with the received input information. Resultant information, referred to herein as an "eflow", represents a flow of the received input information that pertains to a particular node. According to this embodiment, the eflow comprises (1) an eflow identifier, (2) anonymized data (e.g., anonymized PII) and (3) non-anonymized data (e.g., one or more attributes of stored and/or captured information that may be anomalous). The eflow is uploaded from the network sensor engine to an analysis engine, which determines whether the anonymized PII within the eflow already corresponds to a particular identifier.

According to one embodiment, the anonymized PII and its corresponding identifier already may be maintained within a first logical storage element (e.g., a PII reference table stored in a memory). If the anonymized data already corresponds to a particular identifier, the particular identifier is used to reference the eflow identifier and the attribute(s) associated with that eflow instead of the anonymized PII (e.g., identifier substituted for the anonymized PII). If the anonymized PII does not correspond to any identifier, the analysis engine generates an identifier for the eflow and subsequently relates that newly generated identifier to the anonymized PII. The newly generated identifier is used to reference the eflow identifier and attribute(s) associated with the eflow.

Thereafter, any changes in the obfuscation scheme, such as changing in keying material that is used to generate the anonymized PII for example, does not require information within the second logical storage element (e.g., eflow table stored in memory) to be altered. Rather, only the anonymized PII within the PII reference table needs to be re-anonymized using the new keying material.

I. Terminology

In the following description, certain terminology is used to describe features of the invention. For example, in certain situations, the terms "sensor", "logic," and "engine" are representative of hardware, firmware and/or software that is configured to perform one or more functions. For instance, as hardware, a sensor (or logic or engine) may include circuitry having data processing and/or data capturing functionality combined with data transmission and/or storage functionality. For instance, a sensor (or logic or engine) may include data processing circuitry such as a processor (e.g., digital signal processor, microprocessor with one or more processor cores, a programmable gate array, a microcontroller, an application specific integrated circuit, etc.), circuitry with storage functionality such as semiconductor memory, and/or circuitry with data transmission functionality such as wireless or wired transmitter and/or transceiver circuitry.

Alternatively, the sensor (or logic or engine) may be software in the form of one or more software images or software modules, such as executable code in the form of an executable application, an application programming interface (API), a routine or subroutine, a script, a procedure, an applet, a servlet, source code, object code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "data" is broadly defined as information, normally in digitized form. Hence, data may include control information or management information.

The term "flow" broadly refers to a grouping of information. For instance, a flow may include series of related packets in transit or in storage. A "packet" generally refers to information transmitted in any prescribed format, such as a standard packet, a frame, an asynchronous transfer mode (ATM) cell, or the like. One type of flow is referred to as "eflow", which is a grouping of information of which a segment (i.e. portion) of information includes anonymized data.

The series of related packets forming an eflow may feature one of more attributes representing one or more basic properties and/or characteristic of the flow. The attributes may be associated with an executable element or a non-executable element such as a dynamically link library (DLL), a Portable Document Format (PDF) file, a JavaScript® file, Zip® file, a Flash® file, a document (for example, a Microsoft® Office® document, Word® document, etc.), an electronic mail (email), downloaded web page, a text message, or the like.

"Keying material" generally represents information, which may be used as a key or used to generate a key that is utilized by a cryptographic function to obfuscate input information.

A "node" normally represents a particular person or a particular device that is traceable to the particular person or a particular group of persons.

The term "transmission medium" is a physical or logical communication path between two or more network devices (e.g., one of the network devices being an endpoint device with data processing and network connectivity) such as, for example, a server; a mainframe; a firewall; intermediary devices such as a router, a switch or a bridge; or a client device such as a desktop or laptop computer, netbook, tablet, smart phone, set top box, wearable computing device, or a video game console). For instance, the communication path may include wired and/or wireless segments, and/or shared memory locations. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware. Also, the term "match" generally describes that a certain level of comparison has been successfully achieved.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure be considered as an example of the principles of the invention and not intended to limit the invention to the specific embodiments shown and described.

II. Exemplary System Architecture

Referring to FIG. 1, an exemplary block diagram of a communication system 100 deploying a multi-tier security framework (system) 110 is shown. The security framework 110 is adapted to monitor and analyze information associated with network traffic 120 that is routed over transmission medium 130 that partially forms an enterprise network 140. According to one embodiment of the disclosure, the security framework 110 receives, processes and/or stores input information associated with communications occurring within the enterprise network 140.

As shown, the security framework 110 may be communicatively coupled with the transmission medium 130 via a network interface 150. In general, the network interface 150 operates as a data capturing device (sometimes referred to as a "tap" or "network tap") that is configured to receive information propagating to/from one or more endpoint devices $170_1$-$170_M$ (M≥1) and provide at least some of this information to the security framework 110. For instance, the network interface 150 may provide a series of packets or certain information within the packets. Alternatively, although not shown, the security framework 110 may be positioned in-line with the endpoint device(s) $170_1$-$170_M$ without the network interface 150. As another alternative, the network interface 150 may be part of the security framework 110.

Herein, as an illustrative example, the input information may include information associated with a plurality of packets forming incoming network traffic received via a communication network 160. The communication network 160 may include a public network (e.g., Internet) in which case one or more security appliances, such as a firewall for example, are positioned to receive and process network traffic prior to receipt by logic within the security framework 110. Alternatively, the communication network 160 may be a private network such as a wireless data telecommunication network, wide area network (WAN), a type of local area network (LAN), or a combination of networks. As other illustrative examples, the input information may include log information, one or more flow based collections such as netflow (e.g., OSI Layer 4 "L4" information regarding communications monitored by other network devices), and host telemetry information (e.g., information pertaining to one or more endpoint devices $170_1$-$170_M$), as described below.

Although FIG. 1 illustrates the multi-tier security framework 110 within the enterprise network 140, it is contemplated that at least certain logic forming the multi-tier security framework 110 may be operate outside the enterprise network 140. For example, at least some of the functions of the multi-tier security framework 110, such as operations associated with a (data) analysis engine 220 of FIG. 2 for example, may be performed as cloud computing services (e.g., analysis engine 220 situated in the "cloud" and accessible via the Internet or other WAN). This is illustrated by a portion of the multi-tier security framework 110 being positioned outside the enterprise network 140.

Figure 2:
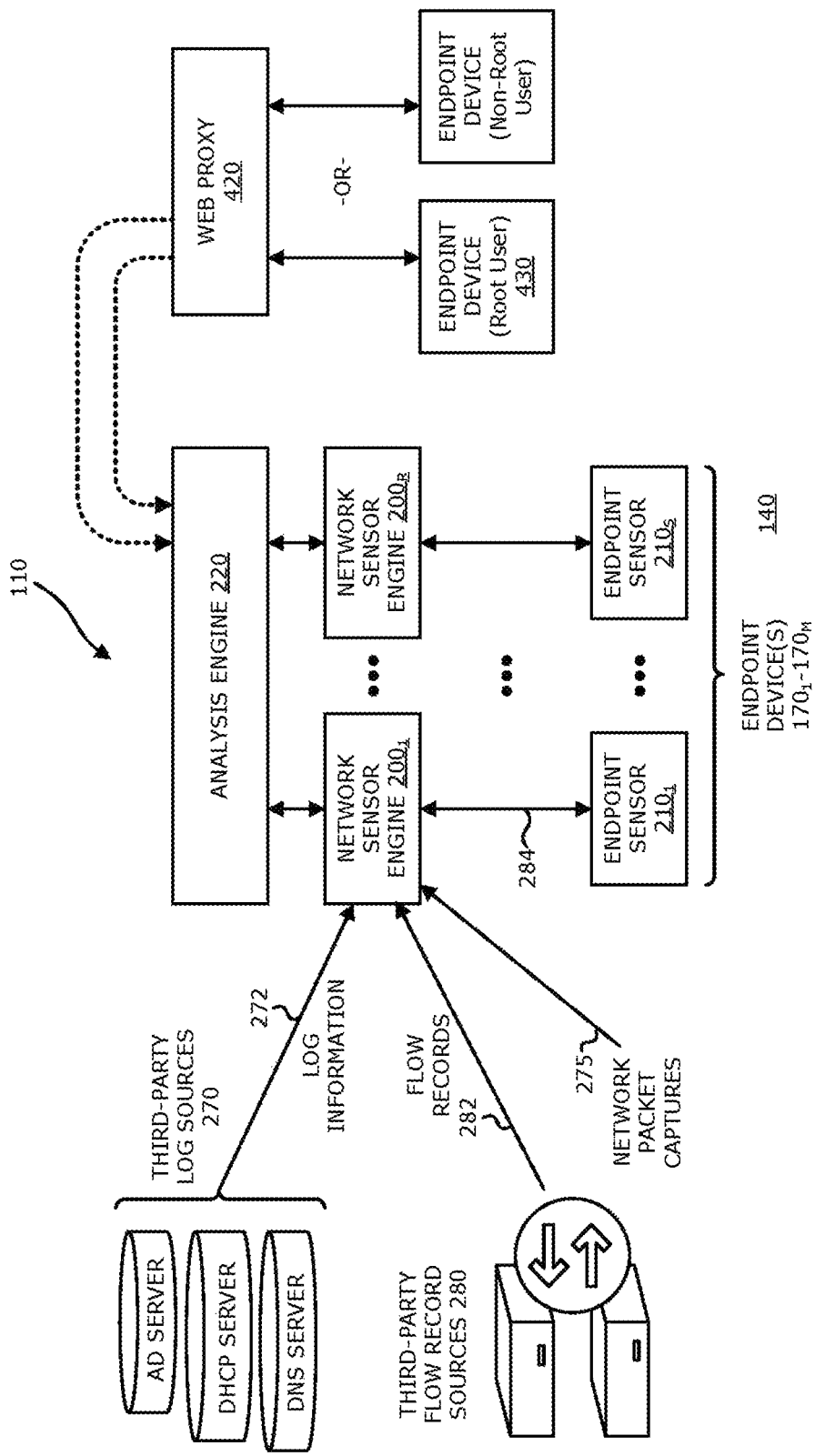
FIG. 2 is an exemplary block diagram of the security framework of FIG. 1.

According to one embodiment of the disclosure, as illustrated in FIG. 2, the security framework 110 comprises one or more network sensor engines $200_1$-$200_R$ (R≥1) and an analysis engine 220. Deployed at various locations within the enterprise network 140 (e.g., campus, data center, etc.), each of the one or more network sensor engines (also referred to as "network sensor engine(s)") $200_1$-$200_R$ may be configured to receive, process and/or store input information. The input information may comprise one or more of the following: (i) log information 272 from different network devices (e.g., third-party log sources 270 such as Active Directory® server logs, Domain Name System "DNS" server logs, Dynamic Host Configuration Protocol "DHCP" server logs, etc.); (ii) information associated with monitored incoming packets 275 that form network traffic, including extracted objects (e.g., files); (iii) flow records 282 from third-party flow record sources 280; and (iv) host telemetry information 284 from one or more endpoint sensors $210_1$-$210_S$ associated with one or more endpoint devices $170_1$-$170_M$ (e.g., client devices and/or servers).

As further shown in FIG. 2, the network sensor engine(s) $200_1$-$200_R$ include at least a first network sensor engine $200_1$ that is adapted to communicate with one or more endpoint sensors $210_1$-$210_S$ (S≥1), which collect and/or store information associated with the endpoint devices $170_1$-$170_M$. These endpoint sensor(s) $210_1$-$210_S$ may be configured as lightweight software sensors deployed on the endpoint devices $170_1$-$170_M$, where the endpoint sensor(s) $210_1$-$210_S$ are adapted to gather information associated with one or more of the endpoint devices $170_1$-$170_M$ and provide host telemetry information 284 to a particular network sensor engine (e.g., first network sensor engine $200_1$) of the network sensor engine(s) $200_1$-$200_R$.

For example, the host telemetry information 284 for a particular endpoint device (e.g., endpoint device $170_1$) may include registry settings and/or registry changes of that endpoint device, running processes list for that endpoint device, memory usage information for that endpoint device, network connection information for that endpoint device, operating system patch level for that endpoint device, files modified since the last update, and/or disk/file system activity of that endpoint device. The gathered host telemetry information 284 may be especially useful when the endpoint device $170_1$-$170_M$ is infected. For example, network connectivity information may be gathered that is associated with a malicious attack in the form of an unintended communication with a malicious Command and Control (CNC) server. Also, information associated with disk/file system activity may be gathered that is associated with a malicious attack to obtain sensitive data stored on a persistent storage device (e.g., computer hard drive, server, etc.).

There may be different endpoint sensors deployed for different devices (e.g., an endpoint sensor for a server endpoint device may be configured to gather different information than an endpoint sensor for a client endpoint device). By way of a specific example, where the endpoint device $170_1$ is a server, the host telemetry information 284 may include application logs that indicate a history of applications running on the server, active network connections of the server, files modified on the server, hash of critical files of the server, information (e.g., file name, access date/time, etc.) that has been exfiltrated, or the like.

Furthermore, the first network sensor engine $200_1$ is adapted to receive network packets propagating to/from one or more devices in the network (e.g., information to/from endpoint devices $170_1$-$170_M$ or other network devices). In some embodiments the first network sensor engine $200_1$ is adapted to extract or generate network sensor data from the network packets. For example, in a specific embodiment, the first network sensor engine $200_1$ is adapted to perform deep packet inspection (DPI) on the packet captures 275 to extract metadata from L2-L7 headers. For example, the first network sensor engine $200_1$ may extract headers associated with Hypertext Transfer Protocol (HTTP) messages.

Furthermore, the first network sensor engine $200_1$ may be adapted to receive log information 272 from one or more remotely located servers (e.g., Active Directory® server, DNS server, DHCP server, etc.) that may form part of the enterprise network 140 or operate in concert with network devices within the enterprise network 140. Herein, the "log information" 272 includes information pertaining to events that have been recorded during communications between the remotely located servers and various endpoint devices. In some embodiments the first network sensor engine $200_1$ is adapted to extract and/or generate metadata from the log information 272.

As an example, the first network sensor engine $200_1$ may be adapted to receive log information 272 from any of the third-party log sources 270 such as an Active Directory® server, which enables the first network sensor engine $200_1$ to generate a user/Internet Protocol (IP) address mapping. Since IP addresses are dynamic and may be re-assigned and the security framework is capable of storing data for a prolonged time period, the user/IP address mapping enables the first network sensor engine $200_1$ to determine a particular user (and her corresponding endpoint device) that was previously assigned a particular IP address at a certain period of time and that endpoint device may have been compromised by malware.

As other illustrative examples, the first network sensor engine $200_1$ may be adapted to receive log information 272 from a DNS server, which provides the first network sensor engine $200_1$ with DNS requests made. Also, the first network sensor engine $200_1$ may be adapted to receive log information 272 from the DHCP server, which may be used to generate a device/IP address mapping. Combined with the user/IP address mapping, the user and device assigned to a particular IP address over the prolonged period of time may be uncovered for that IP address despite reassignment of the IP address during the prolonged period of time.

Besides log information 272, the first network sensor engine $200_1$ may be adapted to communicate and receive flow records (e.g., netflow records, sflow records, jflow records, etc.) 282 from third-party flow record sources 280, namely information associated with communications received and/or monitored by other networks devices within the enterprise network 140 (e.g., IP address(es), port number(s), transport type, statistics concerning the network connection, etc.). The flow records 282 enable the analysis engine 220 (or network sensor engine $200_1$ itself) to formulate a threat exposure mapping (e.g., display of communication paths undertaken by network devices within the enterprise network 140), which may be used to detect anomalous communication patterns through deviations in normal communications by one or more of the network devices, such as an endpoint device (e.g., client device or server) for example. In some embodiments the first network sensor engine $200_1$ is adapted to extract and/or generate metadata from the flow records 282.

During receipt and processing of input information as described above, the first network sensor engine $200_1$ may be adapted to obfuscate (i.e., anonymize) at least some of the input information by anonymizing sensitive or personalized information associated with a user to which the input information pertains. For instance, the first portion of the input information may include personally identifiable information (PII) associated with the user (e.g., user name identifying the user, device name identifying the endpoint device, group name identifying a group of users, etc.). Of course, it is contemplated that the first portion of the input information may include another PII classification (e.g., contact data) other than user data. The anonymized PII along with the non-anonymized data associated with the eflow is provided to the analysis engine 220.

Normally positioned to reside outside the enterprise network 140 of the particular customer, as shown in FIG. 2, the analysis engine 220 is communicatively coupled to the network sensor engines $200_1$-$200_R$ and receives eflows from each of the network sensor engines $200_1$-$200_R$, where each eflow includes the anonymized PII and non-anonymized data (e.g., attributes, raw data associated with the input information in a form of logs, flow records, packet captures, or host telemetry). As an illustrative example, for HTTP traffic monitored by the network sensor engines $200_1$-$200_R$, the network sensor data may include attributes within HTTP messages, where some of these attributes may undergo anonymization (e.g., Host names, Uniform Resource Indicator "URI" or Uniform Resource Locator "URL", etc.) while other data may remain non-anonymized data (e.g., Mime-type, Filename, etc.).

Although not shown in FIG. 2, the analysis engine 220 may be deployed outside of the enterprise network 140 of a particular customer, such as in a private cloud or in a public cloud. However, it is contemplated that the analysis engine 220 may be deployed within the enterprise network 140. As stated above, the analysis engine 220 may be implemented as hardware, software and/or firmware. For instance, the analysis engine 220 may correspond to functionality that is part of processing circuitry or software executed by processing circuitry located with the same appliance as network sensor engine $200_1$-$200_R$ or in a different network device remotely located therefrom.

Herein, the analysis engine 220 is adapted to (i) provide open Application Programming Interface (API) access to the stored network sensor data and (ii) conduct analytics on data within the received eflows. The analytics may be directed to conventional analytics, ad hoc analytics and predictive analytics as set forth in U.S. patent application Ser. No. 14/743,892 entitled "System, Apparatus and Method for Prioritizing the Storage of Content Based on a Threat Index", the entire contents of which are incorporated by reference.

The analysis engine 220 may be configured to collect and anonymize data (as needed for PII) as well as transmit the data to a centralized controller (not shown) for facilitating global threat intelligence. Hence, analysis engines of different customers may be communicatively coupled to the centralized controller. The information transmitted from the analysis engines to the centralized controller may be less and/or different than the information transmitted from the network sensor engines to their corresponding analysis engines.

Web proxy 420 provides high-level (root) administrator 430 access to PII within a first logical storage element (e.g. PII reference table described below) as cleartext and further provides searching functionality according to one or more PII classifications. Web proxy 420 also allows low-level (non-root) administrator 440 access to PII within the first logical storage element; however, some or all of the PII remains as anonymized data. Such operations are described in more detail with respect to FIG. 4.

Figure 3:
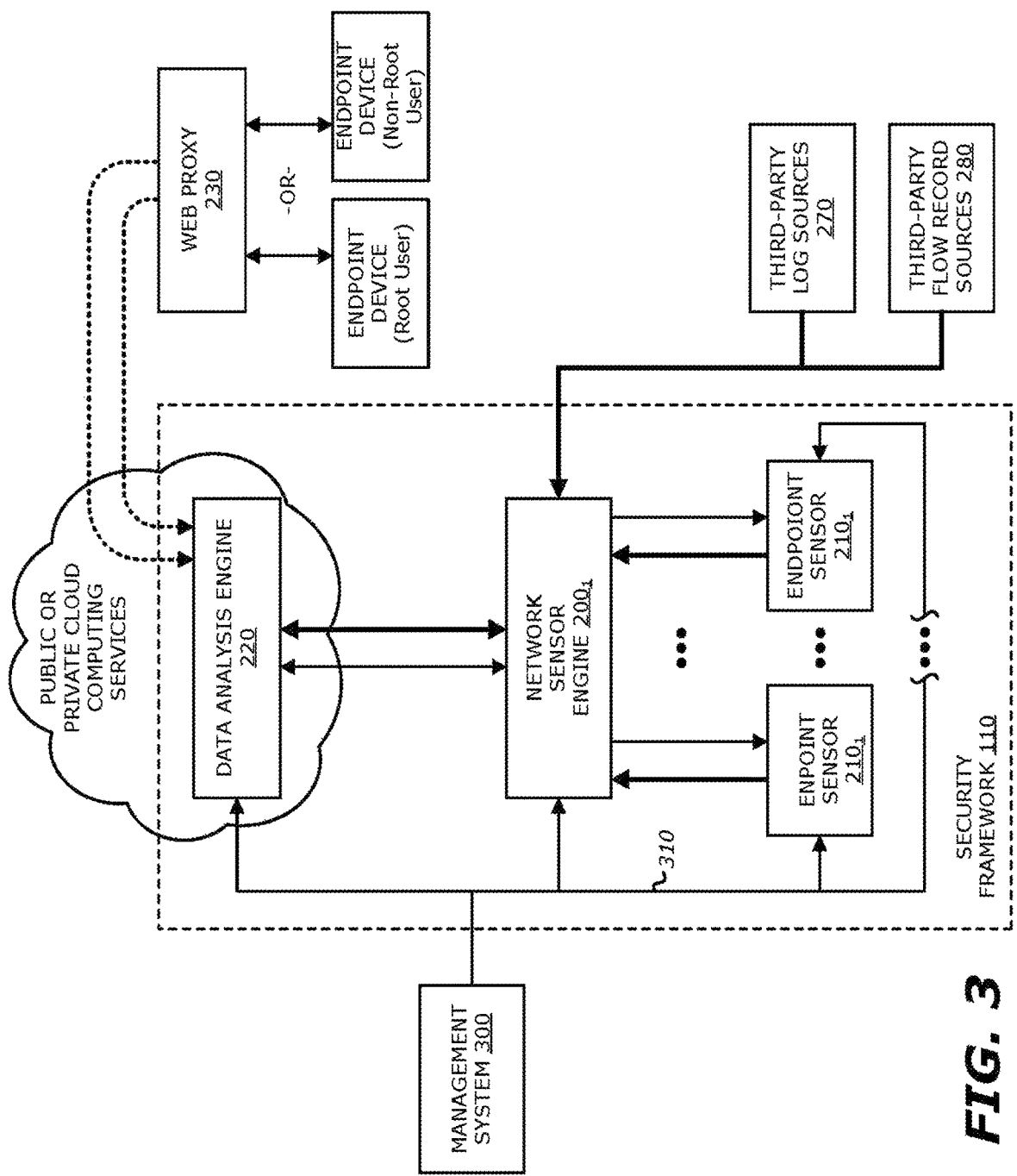
FIG. 3 is a general block diagram of the interoperability of a management system and the security framework of FIG. 2.

Referring to FIG. 3, in order to provide unified management of the security framework 110, a management system 300 may be communicatively coupled and provide control information 310 to the endpoint sensor(s) $210_1$-$210_S$, network sensor engines $200_1$-$200_R$, and/or analysis engine 220. Herein, according to one embodiment of the disclosure, the management system 300 is responsible for provisioning, monitoring operability and overall management of the sensor(s) $210_1$-$210_S$, the network sensor engines $200_1$-$200_R$, and/or the data analysis engine 220. For instance, the provisioning may include conducting and managing software upgrades in order to increase the speed and ease of deployment and configuration of the security framework 110. Likewise, monitoring operability may include performing, in a periodic or aperiodic manner, health checks of the endpoint sensor(s) $210_1$-$210_S$, network sensor engines $200_1$-$200_R$ and/or analysis engine 220; collecting log information and performance data; and providing dashboards about overall health of the security framework 110.

III. Exemplary Operation Flow

Figure 4:
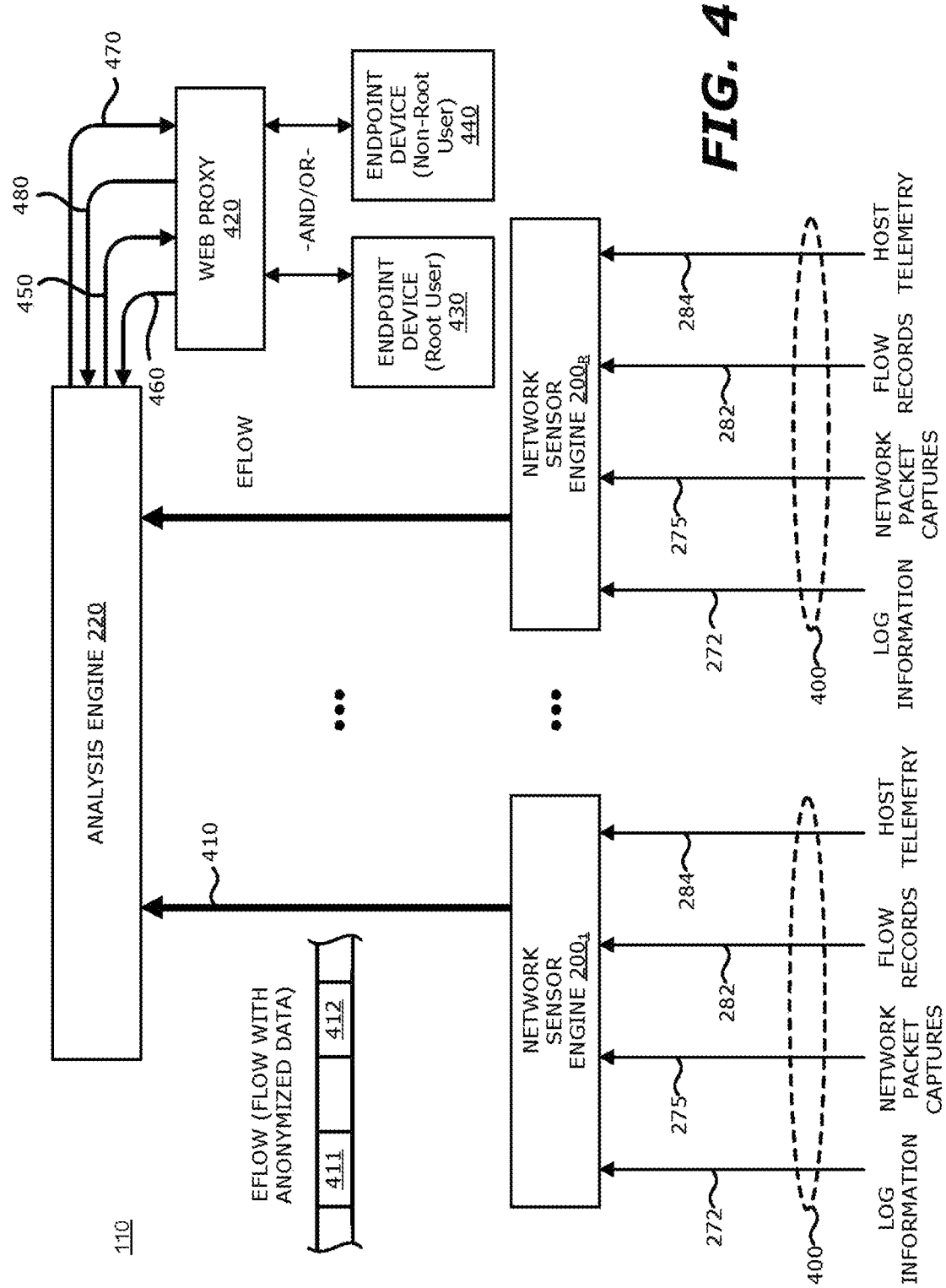
FIG. 4 is a first exemplary embodiment of the operational flow for maintaining anonymized data and effectively handling re-obfuscation of the anonymized data within the security framework of FIGS. 1-2.

Referring now to FIG. 4, a first exemplary embodiment of the operational flow for maintaining anonymized data and effectively handling re-obfuscation of the anonymized data is described. Herein, as shown, the security framework 110 comprises the network sensor engine(s) $200_1$-$200_R$ communicatively coupled to the analysis engine 220. Network sensor engine(s) $200_1$-$200_R$ may be configured to receive, process and/or store input information 400, which may include log information 272, network packet captures 275 obtained in network traffic to/from an endpoint device (not shown), flow records 282, and/or host telemetry information 284 associated with the endpoint devices. Additionally, the network sensor engine(s) $200_1$-$200_R$ are configured to produce one or more eflows 410 based on the input information 400. Certain segments within the eflow 410 may be designated for sensitive information.

For instance, as an illustrative example, upon monitoring data transmitted from a particular source, network sensor engine $200_1$ may generate the eflow 410 that includes a first segment 411 with anonymized data representing a user name for the source. Collectively, or in the alternative, where the monitored data is a Voice over Internet Protocol (VoIP) call, the network sensor engine $200_1$ may generate the eflow 410 that includes a second segment 412 with anonymized data representing the phone number associated with the VoIP call. Data associated with these segments 411 and 412 is obfuscated (anonymized) based on a selected obfuscation scheme for that PII classification.

Figure 5:
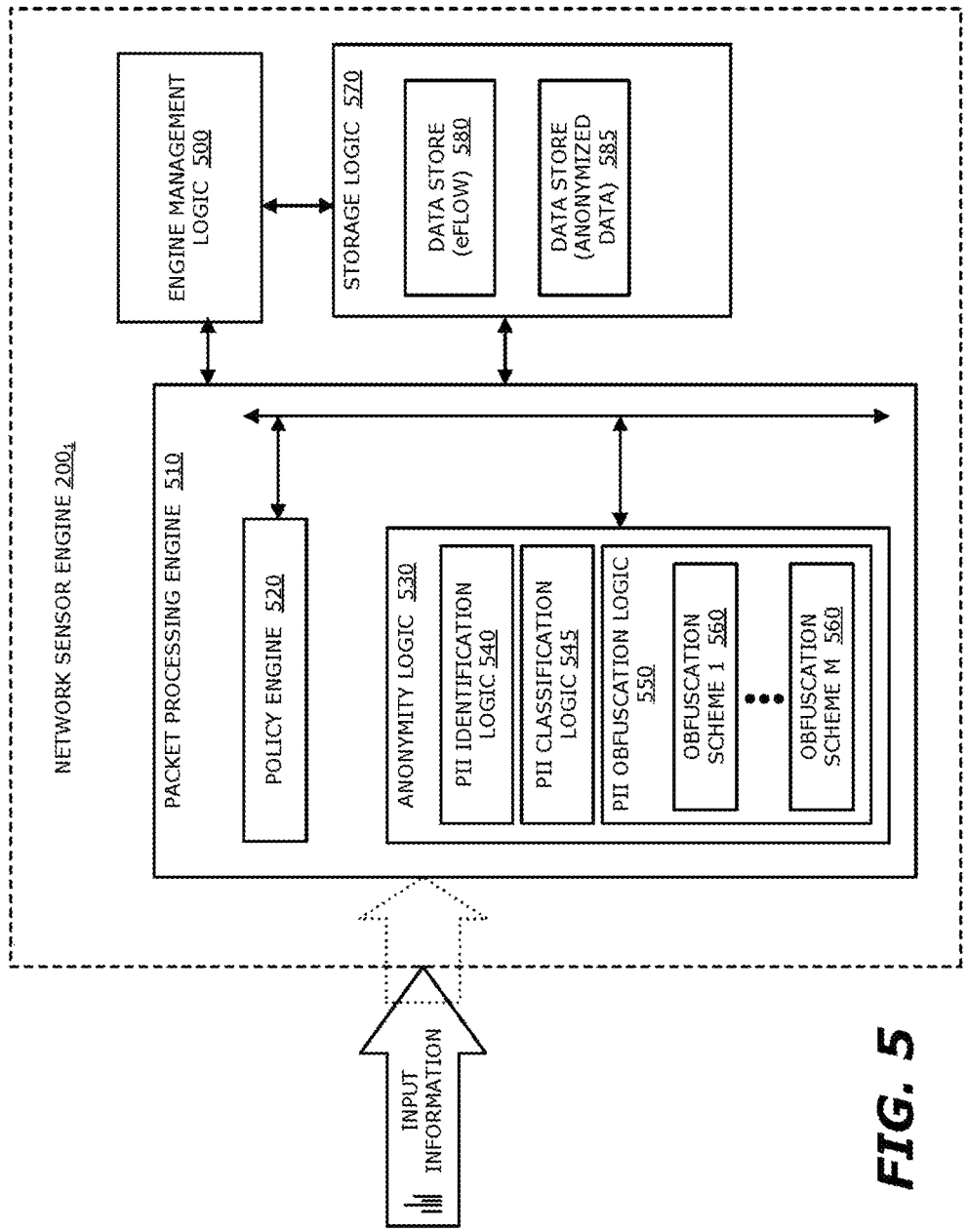
FIG. 5 is an exemplary embodiment of a logical representative of the network sensor engine of FIGS. 2-4.

Referring now to FIG. 5, an exemplary embodiment of a logical representative of the network sensor engine $200_1$ of FIGS. 2-4 is shown. Herein, the network sensor engine $200_1$ comprises engine management logic 500 communicatively coupled to a packet processing engine 510 and storage logic 570. Herein, the engine management logic 500 is responsible for monitoring and/or uploading changes in operability of the network sensor engine $200_1$, such as changes in obfuscation schemes (e.g., different cryptographic algorithms for use, different Exclusive-OR "XOR" schemes, different generic character or symbol substitution schemes, etc.) to a policy engine 520 of the packet processing engine 510. The policy engine 520 pushes policy changes in obfuscation (anonymization) to the anonymity logic 530. As stated above, the network sensor engine $200_1$ may correspond to the functionality provided by processing circuitry such as one or more processors, where the policy engine 520 and/or anonymity logic 530 correspond to hardware, software executed by processor circuitry within the processor(s), or firmware.

Additionally, the engine management logic 500 may be responsible for controlling the storage of input information 400 within data store 580 and the formulation of eflows from the stored data. Such storage may involve extraction of sensitive information (e.g., user names, device names, phone numbers, residential address, etc.) from the input information and storage within data store 585. Data store 580 and 585 may be logical representations (e.g., software drivers) that control the reading/writing to the physical hardware storage situated within an electronic device including the network sensor engine $200_1$ or situated remotely from the network sensor engine $200_1$.

As shown, the packet processing engine 510 is a multi-threaded process that is at least responsible for managing anonymity operations conducted by anonymity logic 530, which includes PII identification logic 540, PII classification logic 545, and PII obfuscation logic 550. As shown, PII identification logic 540 is responsible for identifying and extracting personal identifiable information (PII) from prescribed segments within different types of input information 400 (e.g., network packet captures, log information, flow records, and/or host telemetry information).

The PII classification logic 545 accesses the PII extracted by the PII identification logic 540 and determines what classification such PII belongs. For instance, where the PII is a user name, the PII may be assigned to the "user data" classification. The assignment of the classification associated with the PII is used, by the PII obfuscation logic 550, to determine what obfuscation scheme 560 to use in anonymizing the PII and subsequent placement of the anonymized data into the eflow 410.

Figure 6B:
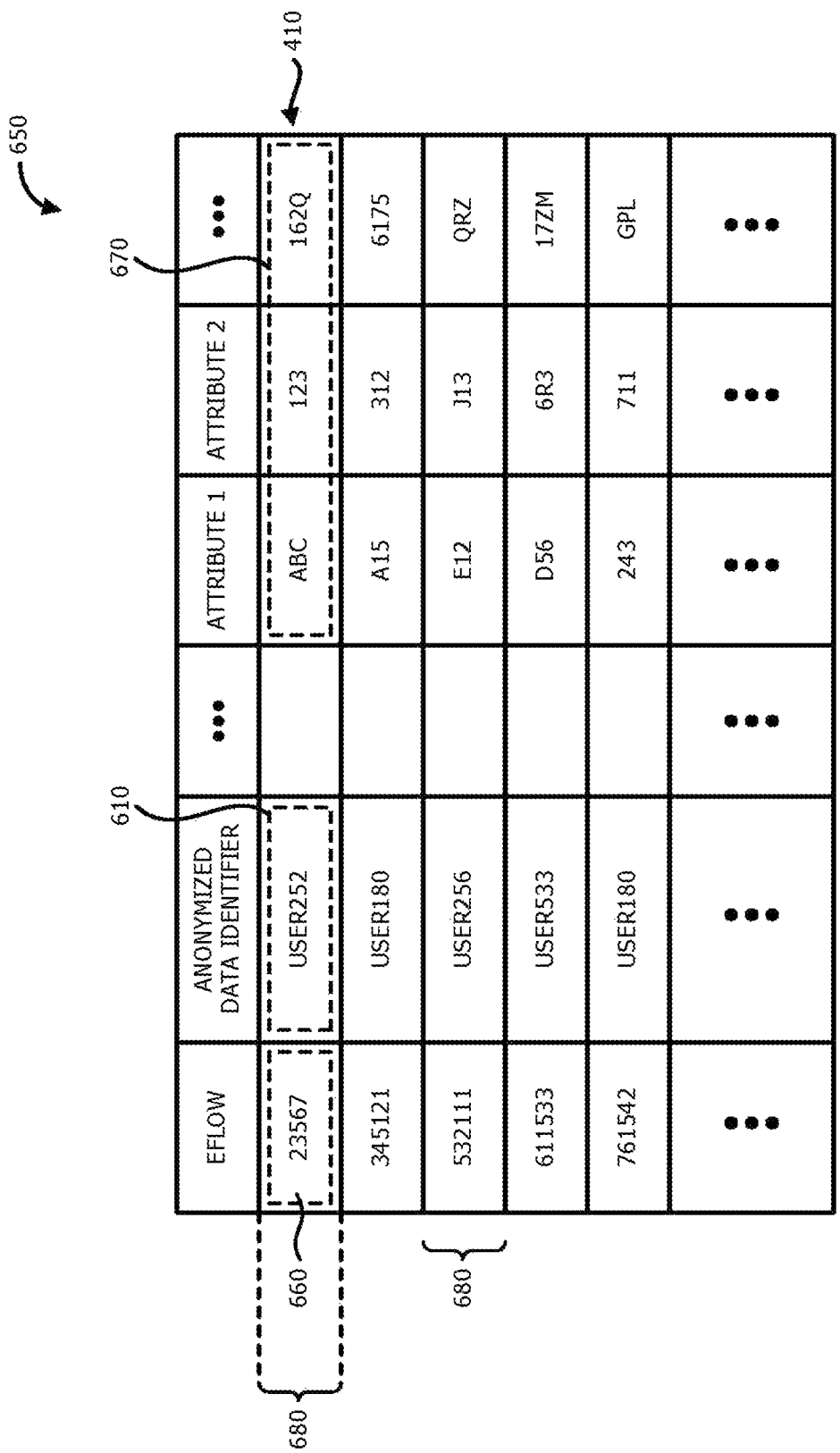
FIG. 6B is an exemplary embodiment of a second logical storage element represented as a Eflow table.

Referring back to FIG. 4, after the PII has been classified and anonymized, the eflow 410 is ready for transmission to the analysis engine 220. Upon receipt of the eflow 410, the analysis engine 220 extracts the anonymized data 411 (e.g., "125FE3B" of FIG. 6A) from the eflow 410 and determines (1) what data classification the anonymized data belongs and (2) is the anonymized data previously stored. According to one embodiment, this may involve a determination as to whether the anonymized data (125FE3B) 411 is already stored in a first logical storage element 600, such as a PII reference table for example, which is stored within internal memory of the analysis engine 220 or data store external to but accessible by the analysis engine 220. If the anonymized data is not previously stored in the PII reference table 600, the analysis engine 220 generates an identifier (e.g., "User256" of FIG. 6A) 610 that now corresponds to the anonymized data (125FE3B) 411 and stores the identifier (User256) 610 as part of the eflow 410 in a second logical storage element 650 such as an eflow table of FIG. 6B. The identifier (User256) 610 now references an eflow identifier 660 (e.g., "23567" of FIG. 6A) for the eflow 410 along with its attributes 670, which include information pertaining to different basic and/or characteristic of the eflow 410 although are merely identified by different alphanumeric characters for illustrative purposes. An exemplary embodiment of the PII reference table 600 and the eflow table 650 are illustrated in FIGS. 6A-6B.

As additional eflows are received by the analysis engine 220, the same operations occur in which the PII reference table 600 is populated with unique anonymized data along with unique identifiers associated therewith. As shown in FIG. 6A, the PII reference table 600 may include all classifications of the anonymized PIIS or a plurality of PII reference tables may be used where each PII reference table stores anonymized data associated with a particular PII classification.

Referring still to FIG. 4, the analysis engine 220 may enter into a maintenance state in which an anonymization update in conducted on the anonymized data. For instance, the customer may request a cryptographic key update based on a number of factors such as the current cryptographic key has been compromised, a certain amount of time has elapsed, or increased security through a system wide key update is desired. Herein, the update may occur in accordance with a variety of update schemes, including the following: (1) a cryptographic key is uploaded to the analysis engine 220 from an enterprise or (2) the PII reference table 600 is downloaded to the enterprise for modification of the anonymized entries of the PII reference table 600 at the enterprise. Thereafter, the modified PII reference table 600 is uploaded for subsequent use by the analysis engine 220.

Regardless of how conducted, the anonymization update is conducted by use of the current keying material to recover the PII in a non-obfuscated state, namely entirely or partially as cleartext. This may include decrypting the anonymized data with the current keying material. Thereafter, the PII in the non-obfuscated state is re-encrypted with the new keying material to produce re-anonymized data, which is substituted for the anonymized data. The corresponding identifier, however, is not modified. Hence, the reference between a particular PII type and its corresponding eflow attributes remain as shown in FIG. 6B.

As an illustrative example, as shown in FIGS. 4 & 6A-6C, a customer requests a cryptographic key update for a global obfuscation change from use of a first keying material (K1) to use of a second keying material (K2). Herein, the update may occur by an enterprise uploading the keying material (K1,K2) to the analysis engine 220 to automatically handle the anonymization update.

The analysis engine 220 using the first keying material (K1) decrypts a first entry 620 of anonymized data (125FE3B) within the PII reference table 600 to recover the user name (Bob Smith). Thereafter, the user name (Bob Smith) is re-encrypted with the second keying material (K2) to produce re-anonymized data (679FD32) 630 for placement into the updated PII reference table 640. These operations continue for the remaining anonymized data (e.g., 367AC9F; 489BD82) to produce the updated anonymized data (4975FFE; 543DA92). However, for each of these updated anonymized data (679FD32; 4975FFE; 543DA92), the analyzer reference identifiers (User256; User180; User533) remain unchanged. Hence, the reference between anonymized data and its corresponding non-anonymized data for the eflows is retained.

IV. Data Retrieval

Referring back to FIG. 4, an exemplary embodiment of the operational flow for accessing anonymized data is described prior to the global obfuscation change. Herein, as shown, the PII reference table 600 of FIG. 6A may include a user interface (UI) reference identifier 615, where the analysis engine 220 assigns an identifier different than the anonymized data identifier 610 for display by non-root users 440 requesting access to the stored eflow data.

More specifically, in response to a request for eflow data from a non-root user 440 (e.g., a cyber-security service provider separate from the enterprise, low-privileged administrator within the enterprise, etc.), the web proxy 420 generates a query 450 to the analysis engine 220 for stored eflow information associated with a particular UI reference name (e.g., "User51" 617 of FIG. 6A). In response, the analysis engine 220 identifies the corresponding anonymized data identifier (e.g., "User256" of FIG. 6A) 610 and accesses the stored eflow information 680 associated with that anonymized data identifier 610. The stored eflow information 680 is subsequently routed as a return message 460 to the web proxy 420, which provides the eflow information 680 in a displayable format to the network device controlled by the non-root user 440. The non-root user 440 is able to search for eflow information based on a particular UI reference identifier (e.g., User51) or based on a portion of the UI reference that may be common to two or more UI reference identifiers (e.g., "User5*"—common to both "User51" & "User57").

Figure 6D:
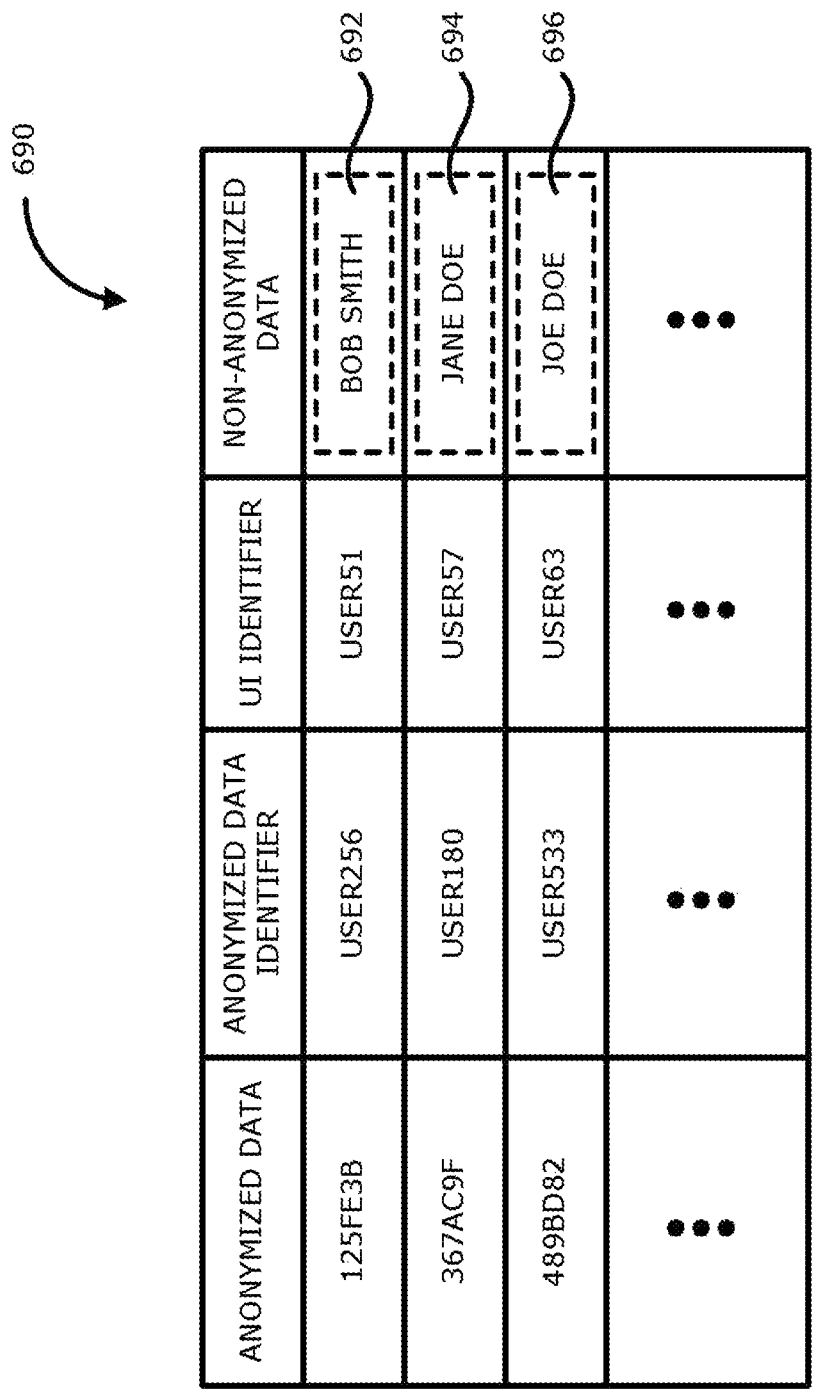
FIG. 6D is an exemplary embodiment of a third logical storage element generated based on a query from a root user for information associated with detected threats.

Alternatively, in response to a request for eflow data from a root user 430 (e.g., high-privilege administrator within the enterprise, etc.), the web proxy 420 generates a query 470 to the analysis engine 220 for stored eflow information 680 associated with a particular UI reference name (e.g., User51 617 of FIG. 6A). In response, the analysis engine 220 identifies the corresponding anonymized data identifier (e.g., User256) 610 and accesses the stored eflow information 680 associated with that anonymized data identifier. The stored eflow information 680 along with corresponding entry data from the PII reference table 600 and keying material is subsequently routed in a response 480 to the web proxy 420, which recovers the cleartext version of the anonymized user name (Bob Smith) and provides the eflow information along with the cleartext user name associated with the eflow in a displayable format to the network device controlled by the root user as shown in FIG. 6D.

The web proxy 420 builds a UI Table 690 that is similar to the PII Reference table 600 of FIG. 6A, but includes cleartext versions 692, 694 & 696 of the anonymized data 620, 622 and 624 for subsequent access by a root user 430 and partial access by the non-root user 440. The root user 420 is able to search for eflow information based on a particular user name (e.g., Bob Smith) as well as by UI reference identifier. As stated above, portions of the cleartext version of the anonymized data and/or the UI reference identifier that is commonly shared by multiple user names (e.g., Bob S*; captures Bob Smith, Bob Sanders, etc.) and/or UI reference identifiers (e.g., User5*; common to both User51 & User57) may be searched by the root user.

Referring to FIG. 7, a second exemplary embodiment of the operational flow is described for generating and maintaining anonymized data and obfuscated identifiers, which are based on personally identifiable information (PII) data that is obfuscated to at least partially form the anonymized data. Herein, as shown, the security framework 110 comprises the network sensor engine(s) $200_1$-$200_R$, which are communicatively coupled to the analysis engine 220 and configured to receive, process and/or store input information 700, which may include log information 272, network packet captures 275, flow records 282, and/or host telemetry information 284. The network sensor engine(s) $200_1$-$200_R$ are further configured to produce one or more eflows 710 based on the input information 700. Certain segments within the eflow 710 may be designated for sensitive information.

For instance, as an illustrative example, upon monitoring data transmitted from one or more sources, network sensor engine $200_1$ may generate the eflow 710 that includes a first segment 711 with anonymized data, such as obfuscated data representing an employee's name for example. Collectively, or in the alternative, the eflow 710 may include other anonymized data, such as a second segment 712 with obfuscated data representing the social security number for that employee. Data associated with each of these segments 711 and 712 is obfuscated (anonymized) in accordance with a selected obfuscation scheme for that PII classification, where the obfuscation scheme used to anonymize data for the first segment 711 of the eflow 710 may differ from the obfuscation scheme used to anonymize data for the second segment 712.

Additionally, the network sensor engine $200_1$ may generate an identifier 713 (hereinafter referred to as a "back-up identifier"), which is based on certain PII data that is part of input information 700 and is uniquely associated with a particular user (e.g. employee name, phone number, social security number, employer identification number, etc.). According to one embodiment of the disclosure, the back-up identifier 713 may be a keyed hash result, namely a hash value generated upon conducting a one-way hash operation based on both the PII data and a key associated with the entity to which the PII data pertains. For example, the key is static and may be associated with a particular enterprise (e.g., company, a division within a company, etc.) that is undergoing incident response testing and supplying input information 700.

Referring still to FIG. 7, after the PII data has been classified and anonymized, the eflow 710 is ready for transmission to the analysis engine 220, which may be on premise or remotely located (e.g., in the cloud). Upon receipt of the eflow 710, the analysis engine 220 extracts the anonymized data 711 (e.g., "125FE3B" of FIGS. 8A and 8B) from the eflow 710 and determines (1) what data classification the anonymized data belongs and (2) is the anonymized data previously stored. According to one embodiment, this may involve a determination as to whether the back-up identifier (e.g., HASH_1 810) is already stored in a first logical storage element 800 such as a first PII reference table for example.

Figures 8A, 8B:
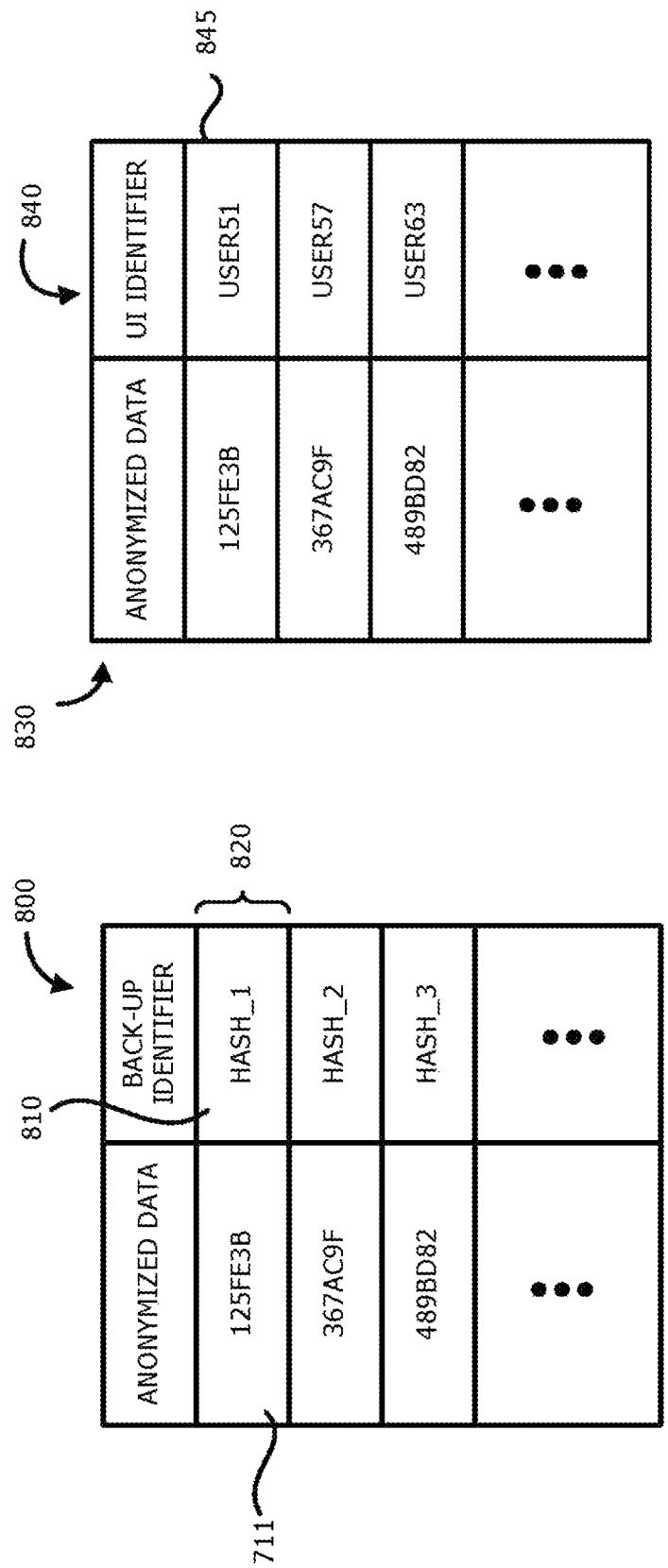
FIG. 8A is an exemplary embodiment of a first logical storage element represented as a Personally Identifiable Information (PII) reference table.
FIG. 8B is an exemplary embodiment of a second logical storage element represented as the PII reference table with an identifier generated based, at least in part, on the PII data.

If the back-up identifier (Hash_1 810) is previously stored in the first PII reference table 800, the analysis engine 220 may overwrite the stored anonymized data within an entry 820 of the first PII reference table 800 with the extracted anonymized data (125FE3B) 711 or stored the extracted anonymized data (125FE3B) 711 into an additional entry (not shown) within the first PII reference table 800 that corresponds to HASH_1 810, as shown in FIG. 8A. As a result, the back-up identifier (Hash_1 810) now corresponds to the anonymized data (125FE3B) 711. Although not shown, different attributes acquired from the eflow 710 may be stored with the back-up identifier 810 and the anonymized data 711.

If the back-up identifier (Hash_1 810) is not previously stored in the first PII reference table 800, the analysis engine 220 creates a new entry (e.g., entry 820) within the first PII reference table 800, where the back-up identifier (Hash_1 810) now corresponds to the anonymized data (125FE3B) 711.

As further shown in FIGS. 7 and 8B, a second PII reference table 830 may be generated to include a user interface (UI) reference identifier 840, where the analysis engine 220 assigns an identifier (e.g., "USER51" 845) different than the back-up identifier 810 for display by a non-root user 430 of FIG. 7 who is requesting access to the stored eflow data, as previously described. Hence, the first PII reference table 800 allows for recovery and detection of the particulars associated with the stored anonymized data in response to corruption of the second PII reference table 830.

In the foregoing description, the invention is described with reference to specific exemplary embodiments thereof. It will, however, be evident that various modifications and changes may be made thereto without departing from the broader spirit and scope of the invention.

What is claimed is:

1. A computerized method for obfuscating, according to an obfuscation scheme, data that are part of a flow prior to analysis of the flow for malware, the method comprising:
   generating a flow identifier for the flow;
   identifying one or more personally identifiable information (PII) segments of data in the flow;
   generating a data identifier for each of the one or more PII segments of data;
   substituting each data identifier for a corresponding PII segment of data as part of the flow;
   associating each data identifier with the flow identifier;
   determining whether recovery of the one or more PII segments of data is desired;
   anonymizing the PII segments of data, comprising:
      encrypting PII segments of data for which recovery is desired with a first keying material, and
      hashing PII segments of data for which recovery is not desired;
   maintaining the anonymized PII segments of data and the corresponding data identifiers separately from the flow; and
   responsive to changing the obfuscation scheme, decrypting the encrypted PII segments of data with the first keying material and reencrypt the decrypted PII segments of data with a second keying material without altering the corresponding data identifier or the flow.

2. The computerized method of claim 1, wherein the maintaining the anonymized PII segments of data and the corresponding identifiers separately from the flow comprises storing the anonymized PII segments of data and the corresponding identifiers in a first region of memory and the flow, including non-anonymized data and the identifiers, in a second region of the memory.

3. The computerized method of claim 1 further comprising:
   generating a second identifier for each of the one or more anonymized PII segments of data; and
   maintaining the one or more anonymized PII segments of data and the corresponding second identifiers separately from the flow.

4. The computerized method of claim 3, wherein the generating of the second identifier for each of the anonymized PII segments of data comprises generating a hash result for each of the anonymized PII segments of data.

5. The computerized method of claim 3, wherein the maintaining the anonymized PII segments of data and the corresponding identifiers separately from the flow comprises storing the anonymized PII segments of data and the corresponding identifiers in a first region of a first memory, storing the anonymized PII segments of data and the corresponding second identifiers in a second region of a second memory, and the flow, including non-anonymized data and the identifiers, in a third region of the memory.

6. A data security system that obfuscates one or more segments of data that are part of a flow prior to analysis of the flow for malware, the system comprising:
   a network sensor engine including processing circuitry that is configured to (i) generate a flow identifier for the flow, and (ii) identify one or more personally identifiable information (PII) segments of data in the flow; and
   an analysis engine communicatively coupled to the network sensor engine, the analysis engine including processing circuitry that is configured to (i) generate a data identifier for each of the one or more PII segments of data, (ii) substitute each data identifier for a corresponding PII segment of data as part of the flow, associate the data identifiers with the flow identifiers, where the one or more PII segments of data and the corresponding data identifiers are stored separately from the flow, determine whether recovery of the one or more PII segments of data is desired, (iii) anonymize the PII segments of data, comprising encrypt PII segments of data for which recovery is desired with a first keying material, and hash PII segments of data for which recovery is not desired, and (iv) responsive to changing the obfuscation scheme decrypt the encrypted PII segments of data with the first keying material and reencrypt the decrypted PII segments of data with a second keying material without altering the corresponding data identifiers or the flow.

7. The data security system of claim 6, the analysis engine storing the anonymized PII segments of data and the corresponding identifiers separately from the flow by storing the anonymized PII segments of data and the corresponding identifiers in a first region of memory and the flow, including non-anonymized data and the identifiers, in a second region of the memory.

8. The data security system of claim 6, wherein the analysis engine is further configured to generate a second identifier for each of the anonymized PII segments of data, and maintain the anonymized PII segments of data and the corresponding second identifiers separately from the flow.

9. The data security system of claim 8, wherein the analysis engine is configured to generate the second identifier for each of the anonymized PII segments of data, including generating a hash result for each of the PII segments of anonymized data.

10. The data security system of claim 8, wherein the analysis engine is configured to maintain the anonymized PII segments of data and the corresponding identifiers separately from the flow by storing the anonymized PII segments of data and the corresponding identifiers in a first region of a first memory, storing the anonymized PII segments of data and the corresponding second identifiers in a second region of a second memory, and storing the flow, including non-anonymized data and the identifiers, in a third region of the memory.

11. A data security system that obfuscates one or more segments of data that are part of a flow prior to analysis of the flow for malware, the system comprising:

one or more processors; and a memory communicatively coupled to the one or more processors, the memory including a network sensor engine that is configured to (i) generate a flow identifier for the flow, and (ii) identify one or more personally identifiable information (PII) segments of data in the flow; and an analysis engine communicatively coupled to the network sensor engine, the analysis engine being configured to (i) generate a data identifier for each of the one or more PII segments of data, (ii) substitute each data identifier for a corresponding PII segment of data as part of the flow, associate the data identifiers with the flow identifiers, and where the one or more PII segments of data and the corresponding data identifiers are stored separately from the flow, determine whether recovery of the one or more PII segments of data is desired, (iii) anonymize the PII segments of data, comprising encrypt PII segments of data for which recovery is desired with a first keying material, and hash PII segments of data for which recovery is not desired, and (iv) responsive to changing the obfuscation scheme decrypt the encrypted PII segments of data with the first keying material and reencrypt the decrypted PII segments of data with a second keying material without altering the corresponding data identifiers or the flow.

* * * * *